(12) United States Patent
Klann

(10) Patent No.: US 10,781,023 B2
(45) Date of Patent: Sep. 22, 2020

(54) DEVICE FOR CONTROLLING GAS, VAPOR, PRESSURE WITHIN A PACKAGE

(71) Applicant: LaserSharp FlexPak Services, LLC, Vadnais Heights, MN (US)

(72) Inventor: Kenneth Klann, Vadnais Heights, MN (US)

(73) Assignee: LaserSharp FlexPak Services, LLC, Vadnais Heights, MN (US)

( * ) Notice: Subject to any disclaimer, the term of this patent is extended or adjusted under 35 U.S.C. 154(b) by 0 days.

(21) Appl. No.: 16/258,590

(22) Filed: Jan. 26, 2019

(65) Prior Publication Data

US 2019/0225402 A1 Jul. 25, 2019

Related U.S. Application Data

(63) Continuation-in-part of application No. 15/881,667, filed on Jan. 26, 2018.

(Continued)

(51) Int. Cl.
*B65D 33/01* (2006.01)
*B65D 77/22* (2006.01)
(Continued)

(52) U.S. Cl.
CPC ............ *B65D 77/225* (2013.01); *A23B 7/148* (2013.01); *A23L 3/3418* (2013.01); *B65D 65/40* (2013.01);
(Continued)

(58) Field of Classification Search
CPC ..................................................... B65D 33/01
See application file for complete search history.

(56) References Cited

U.S. PATENT DOCUMENTS 3,937,396 A 2/1976 Schneider
4,121,595 A 10/1978 Heitmann et al.
(Continued)

FOREIGN PATENT DOCUMENTS

EP 0144011 B2 12/1992
EP 1340695 A1 9/2003
(Continued)

OTHER PUBLICATIONS

Agrawal et al, Simulation of Gas Flow in Microchannels With a Single 90 Degree Bend, Jan. 27, 2009, Sciencedirect, vol. 38, Issue 8, pp. 1629-1637, Discipline of Mechanical Engineering, University of Newcastle, Callaghan, NSW 2308, Australia.
(Continued)

*Primary Examiner* — William P Watkins, III
(74) *Attorney, Agent, or Firm* — Campbell IP Law LLC

(57) ABSTRACT

A device for controlling package pressure and gas flow for a packaged good comprises a film having a first opening for exposure to the inside of a package and a second opening for exposure to the outside of a package. A channel extends between the first opening and the second opening. The dimensions of the channel are configured to control the rate of flow of $CO_2$ (cc/min @ 1 PSI) from the inside of the package to the outside of the package and control the oxygen transmission rate (cc/day/Atm) from the outside of the package to the inside of the package so that a flow of $CO_2$/OTR ratio is at an acceptable level for the packaged good.

19 Claims, 12 Drawing Sheets

Related U.S. Application Data

(60) Provisional application No. 62/617,542, filed on Jan. 15, 2018.

(51) Int. Cl.

| | | |
|---|---|---|
| *A23L 3/3418* | (2006.01) | |
| *B65D 81/20* | (2006.01) | |
| *B65D 65/40* | (2006.01) | |
| *B65D 85/34* | (2006.01) | |
| *B65D 81/24* | (2006.01) | |
| *A23B 7/148* | (2006.01) | |

(52) U.S. Cl.
CPC ......... *B65D 81/2069* (2013.01); *B65D 81/24* (2013.01); *B65D 85/34* (2013.01)

(56) References Cited

U.S. PATENT DOCUMENTS

| | | | |
|---|---|---|---|
| 4,134,535 | A | 1/1979 | Barthels et al. |
| 5,229,180 | A | 7/1993 | Littmann |
| 5,259,401 | A | 11/1993 | Lange et al. |
| 5,263,777 | A | 11/1993 | Domke |
| 5,427,839 | A | 6/1995 | Buchner et al. |
| 5,515,994 | A | 5/1996 | Goglio |
| 5,629,060 | A | 5/1997 | Garwood |
| 5,727,881 | A | 3/1998 | Domke |
| 5,782,266 | A | 7/1998 | Domke |
| 6,116,782 | A | 9/2000 | Arkins et al. |
| 6,662,827 | B1 | 12/2003 | Clougherty et al. |
| 6,663,284 | B2 | 12/2003 | Buckingham et al. |
| 7,083,837 | B1 * | 8/2006 | Varriano-Marston ........................ B23K 26/0846 428/34.1 |
| 7,178,555 | B2 | 2/2007 | Engel et al. |
| 7,490,623 | B2 | 2/2009 | Rypstra |
| 7,527,840 | B2 | 5/2009 | Zeik |
| 7,874,731 | B2 | 1/2011 | Turvey et al. |
| 8,038,023 | B2 | 10/2011 | Moore et al. |
| 8,197,138 | B2 | 6/2012 | Turvey |
| 8,226,878 | B2 * | 7/2012 | Huo ........................ B23K 26/16 264/400 |
| 8,636,034 | B2 | 1/2014 | Hoffman et al. |
| 8,887,766 | B2 | 11/2014 | Stotkiewitz et al. |
| 9,174,308 | B2 | 11/2015 | Chow et al. |
| 9,187,229 | B2 | 11/2015 | Hoffman et al. |
| 2002/0054969 | A1 | 5/2002 | Clarke et al. |
| 2003/0029850 | A1 | 2/2003 | Varriano-Marston |
| 2004/0000336 | A1 | 1/2004 | Goglio |
| 2007/0042885 | A1 | 2/2007 | Rietjens et al. |
| 2007/0116915 | A1 | 5/2007 | Perre et al. |
| 2008/0149604 | A1 | 6/2008 | Varriano-Marston et al. |
| 2008/0190512 | A1 | 8/2008 | Borchardt |
| 2008/0254170 | A1 | 10/2008 | Darin |
| 2008/0310770 | A1 | 12/2008 | Turvey et al. |
| 2010/0040310 | A1 | 2/2010 | Turvey |
| 2010/0224508 | A1 | 9/2010 | Yuyama et al. |
| 2011/0211773 | A1 | 9/2011 | Romeo et al. |
| 2011/0262589 | A1 | 10/2011 | Safarik |
| 2012/0128835 | A1 | 5/2012 | Lyzenga et al. |
| 2013/0284738 | A1 | 10/2013 | Haimi |
| 2014/0029873 | A1 | 1/2014 | Cruz et al. |
| 2014/0065356 | A1 | 3/2014 | Chow et al. |
| 2015/0102022 | A1 | 4/2015 | Crable et al. |
| 2015/0122818 | A1 | 5/2015 | Bruna |
| 2015/0123317 | A1 | 5/2015 | Sorem et al. |
| 2015/0306704 | A1 | 10/2015 | Sohn et al. |
| 2016/0185501 | A1 | 6/2016 | Hansen |
| 2016/0340085 | A1 | 11/2016 | Pettis et al. |
| 2017/0247159 | A1 | 8/2017 | Hansen |
| 2017/0320169 | A1 | 11/2017 | Klann |
| 2017/0320642 | A1 | 11/2017 | Klann |
| 2017/0349348 | A1 | 12/2017 | Tzu |

FOREIGN PATENT DOCUMENTS

| | | | | |
|---|---|---|---|---|
| EP | 1893490 | A4 | 8/2009 | |
| EP | 2272661 | A1 | 1/2011 | |
| EP | 2824039 | A1 | 1/2015 | |
| WO | WO-8807479 | A1 * | 10/1988 | ............. B65D 33/01 |
| WO | 2015004221 | A1 | 1/2015 | |

OTHER PUBLICATIONS

Amit Agrawal, A Comprehensive Review on Gas Flow in Microchannels, Jul. 2013, Researchgate, vol. 2—No. 1—2011, 40 pages, Indian Institute of Technology Bombay, Department of Mechanical Engineering, Mumbai, India.

Halwidl, D, Development of an Effusive Molecular Beam Apparatus, Apr. 7, 2016, Springer, Chapter 2, "Flow of Gases".

Lijo et al, Effects of Choking on Flow and Heat Transfer in Micro-channels, Nov. 14, 2011, Sciencedirect, vol. 379, Issue 38, International Journal of Heat and Mass Transfer 55 (2012), pp. 701-709, School of Mechanical Engineering Andong National University, Andong 760-749, Republic of Korea.

O.I. Rovenskaya, Computational Study of 3D Rarefied Gas Flow in Microchannel With 90 Bbend, Apr. 29, 2016, Sciencedirect, vol. 59, European Journal of Mechanics B/Fluids 59 (2016), pp. 7-17, Dorodnicyn Computing Centre, Federal Research Centre "Computer Science and Control" of Russian Academy of Sciences, Vavilova st. 40, 119 333 Moscow, Russia.

Pugmire et al, Surface Characterization of Laser-Ablated Polymers Used for Microlluidics, Jan. 9, 2002, ACS Publications, Anal. Chem. 2002, 74, 871-878, National Institute of Standards and Technology, Gaithersburg, Maryland 20899, and Center for Microanalysis of Materials, University of Illinois at UrbanaChampaign, Urbana, Illinois 61801.

Shan et al, On Mechanisms of Choked Gas Flows in Microchannels, Jul. 29, 2015, Sciencedirect, vol. 379, Issue 38, Physics Letters A 379 (2015), pp. 2351-2356, Department of Engineering Mechanics and CNMM, Tsinghua University, Beijing 100084, China.

Wang, Understanding the Formation of CO2 and Its Degassing Behaviours in Coffee, May 1, 2014, Thesis, The University of Guelph, Ontario, Canada.

White et al, A DSMC Investigation of Gas Flows in Micro-channels With Bends, Nov. 6, 2012, Sciencedirect, vol. 71, pp. 261-271, Department of Mechanical and Aerospace Engineering, University of Strathclyde, Glasgow G1 1XJ, UK.

Xiao-Dong Shan et al, Effective Resistance of Gas Flow in Microchannels, Apr. 2, 2013, Researchgate, vol. 2013, Advances in Mechanical Engineering vol. 2013, Article ID 950681, 7 pages, Department of Engineering Mechanics and CNMM Tsinghua University, Beijing 100084, China.

* cited by examiner

DEVICE FOR CONTROLLING GAS, VAPOR, PRESSURE WITHIN A PACKAGE

PRIORITY CLAIMS

This application claims priority from U.S. patent application Ser. No. 15/881,667 filed Jan. 26, 2018, which in turn claims priority to provisional application No. 62/617,542, filed Jan. 15, 2018, the entire contents of which are herewith incorporated by reference.

FIELD OF THE DISCLOSURE

The present disclosure relates in general to pressure relief devices and methods for packaged goods, and more particularly, relates to devices and methods for selectively controlling the flow of specific gases into and out of a package to extend the shelf-life of packaged goods.

BACKGROUND

Many perishable food items packaged in flexible packaging films are subject to pressure buildup from off-gassing or subject to spoilage from improper levels of oxygen or water vapor. In the case of packaged living produce such as vegetables or fruits, for example, oxygen transfer into the package and outgassing of $CO_2$ or other gases must be controlled to a particular level for each kind of produce and its unique cellular respiration needs or other biological characteristics. In the case of packaged roasted coffee, substantial amounts of $CO_2$ off-gassing occurs over a prolonged period, which necessitates a mechanism for relieving the rising pressure inside of the package to avoid package rupture or failure which can occur at pressures as low as 1 PSI. To remedy these issues, several methods and devices have been utilized, including micro-perforating the packaging film or applying one-way valves.

For example, in U.S. Pat. No. 5,263,777, a common one-way pressure-relief valve design is disclosed for coffee bags, teaching a membrane or film with an adhesive-free non-bonded center zone that normally sits against and covers a hole or holes in the package wall. The membrane is secured to the wall of the package via two parallel adhesive strips on either side of the center zone. When package pressure increases to a certain threshold, it causes the membrane to lift off the holes in the package wall, thus unseating or opening the valve, and thereby forming a channel through which package gas can escape out of either open end of the membrane that is not secured via the adhesive strips. Once the flow decreases to some threshold, the membrane reseats onto the wall of the package and over the holes to once again reseal the package and prevent entry of atmospheric air including oxygen.

As described in U.S. Pat. No. 5,427,839, for example, such valves as described above can also be provided in a roll form such as a composite strip, transported as such to a packaging machine, and separated consecutively and installed with adhesive onto pre-made packages. In contrast, others describe designing the pressure release valve in the flexible packaging laminate itself via an unbonded valve region between two lamina, such as described in U.S. Pat. No. 7,527,840.

Although there are numerous patents that describe various configurations and optimizations of these pressure relief valves, they all suffer from some common disadvantages. For example, when the package wall or material is flexed or otherwise externally stressed through packing, transport or other handling in a region where the valve is present, the valve material may unseat or separate even in the absence of a pressure differential, causing unwanted exchange of gases through the valve and into the package. Thus, placement of such valves may be restricted to areas of the packaging least likely to receive such flexing or stretching, thereby limiting the freedom of package design and handling.

Further, even when functioning properly, these pressure relief valves form a passageway or channel that is relatively large and allows atmospheric oxygen to creep back into the package even as internal gas is being expelled. This is particularly true toward the end of the pressure release cycle when the velocity of the expelled gas decreases and the valve takes time to close again. With respect to packaged coffee, the oxygen reacts with the coffee to form peroxides which adversely affect aroma and flavor.

Furthermore, the aroma of roasted coffee primarily comes from aromatic, volatile compounds which easily evaporate at room temperature and pressure and which continue to accumulate in the coffee bag even after roasting. Preserving these compounds inside of the bag and up until the brewing of the coffee is key to ensuring the highest quality taste and smell experience. However, with all the prior methods of pressure release, these aromatic compounds are released along with the $CO_2$ in an indiscriminate manner, thus quickly diminishing the quality of packaged coffee to a matter of a few weeks. Further, these prior methods do not adequately control or restrict the level of oxygen entering the bag, which also causes oxidation and other catalyzed reactions with the aromatic compounds thus destroying their character.

When microperforations are used for packaged coffee, they cannot be made of a sufficiently small diameter to overcome the drawbacks described above, and therefore suffer from at least the same issues of oxygen creep and indiscriminate gas transfer across the package wall, with the added disadvantage of never being closed off from the atmosphere. With respect to living produce such as fruits and vegetables still engaged in cellular activity during transport and storage, a certain minimal amount of oxygen concentration must be maintained inside of the package to prevent cell death and spoilage while also out-gassing $CO_2$ to acceptable levels from the package. Again, the limit on microperforation diameter results in an inability to fine-tune the oxygen transfer and transfer of other relevant gases to an acceptable level for each type of produce.

Due to these numerous issues with prior art methods and devices, the quality of bagged coffee quickly deteriorates over the course of weeks, and packaged produce tends to spoil much too quickly, resulting in tons of foods waste annually for businesses and families, and to the detriment of society.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure relates to devices and methods for relieving the pressure of a packaged good and selectively controlling the flow rates of gas between the inside and the outside of the package based on the unique requirements of the packaged good.

In one aspect, a device for controlling package pressure and gas flow for a packaged good is described, comprising a film having a first opening for exposure to the inside of a package and a second opening for exposure to the outside of a package, and a channel extending between the first opening and the second opening. The dimensions of the channel are configured to control the rate of flow of $CO_2$ (cc/min @ 1 PSI) from the inside of the package to the outside of the package and control the oxygen transmission rate (cc/day/Atm) from the outside of the package to the inside of the package so that a flow of $CO_2$/OTR ratio is at an acceptable level for the packaged good.

In another aspect, a method for controlling package pressure and gas flow for a packaged good is also described, comprising identifying an acceptable $CO_2$ level and oxygen transmission rate requirements for the packaged good; determining the appropriate cross sectional area and length of a channel that can control the rate of flow of $CO_2$ from the inside of the package to the outside of the package and control the oxygen transmission rate from the outside of the package to the inside of the package so that both the acceptable $CO_2$ level and oxygen transmission rate requirements would be satisfied; and forming a channel in a film structure based on the determined appropriate cross sectional area and length for the channel.

Other aspects and variations thereof will be apparent from the following disclosures and figures referenced herein.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which.

DETAILED DESCRIPTION

Figure 1:
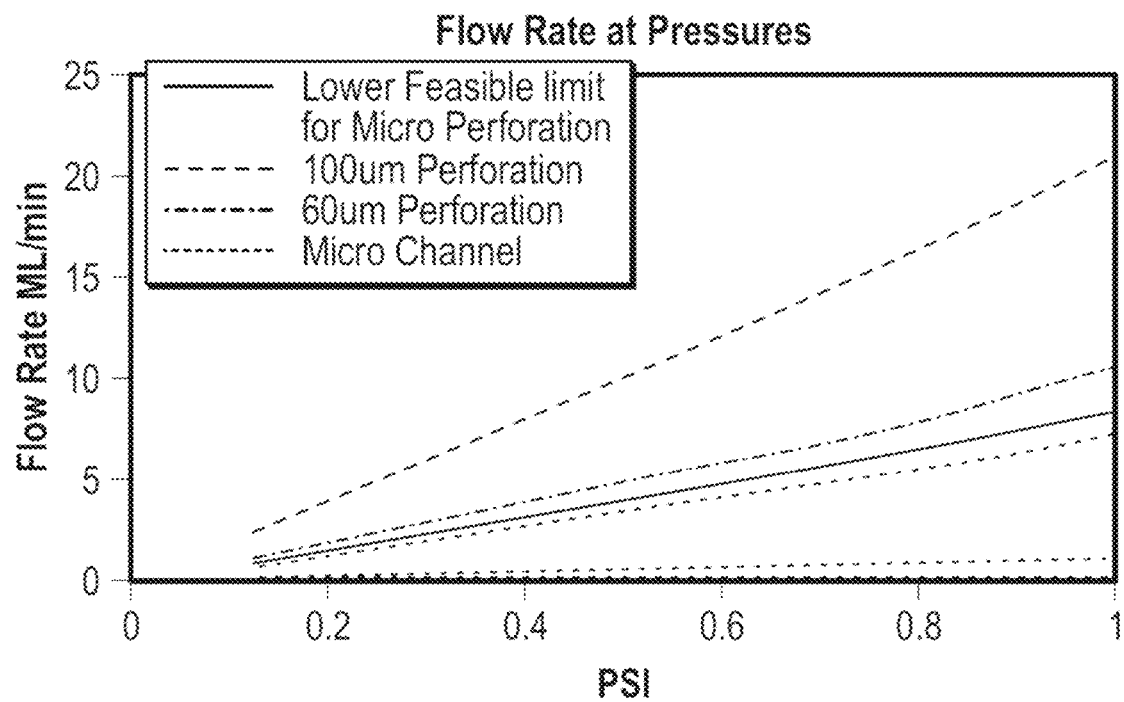
FIG. 1 shows a flow rate diagram between flow rate and PSI for different microchannels and perforation.

Described herein is an improved device and method for regulating the pressure of packaged goods, as well as controlling the flow rate and diffusion characteristics of different gases in a selective manner depending on the needs of the application and requirements of the packaged good, including for example coffee and fresh produce.

The feasible lower limit to a micro-perforation in common packaging film is about 50 micrometers in diameter, which as described above, limits the variety of venting that can be done in microperforated packages with respect to control of oxygen transfer rate (OTR) as well as the control of gas flow, such as $CO_2$, $O_2$, volatile compounds, and others. For example, in order to meet the high $CO_2$ off-gassing and venting needs of a packaged coffee, the microperforation must be designed with a relatively large diameter, but the larger the diameter the more oxygen tends to migrate into the package. Thus, often the requirements of $CO_2$ venting are antagonistic to the requirements of OTR for package design.

Valves can also be used in flexible packaging; however they have several drawbacks in that they need to be applied to the packaging film during the forming and filling process, have an inherent cracking pressure that requires a minimum pressure buildup of the package, and allow all gases to flow unrestricted through the valve, among other issues described above.

The inventive micro-channels and method described herein provide numerous advantages over the prior art valves and microperforations and are more consistent in performance in both OTR and gas flow than perforations, since perforations are more subject to clogging, among other issues. As used herein, the term "micro" with respect to the channels is used to indicate that they are designed to be of a small enough size to preferentially restrict the flow of certain gases or molecules over others, as opposed to the prior art channels in valves described above, which indiscriminately allow the flow of all gases and molecules through in both directions when the channel is opened. Thus, "micro" does not necessarily denote a size of channel that can only be measured in micrometers, as may be appreciated from the disclosure and examples provided herein.

The micro-channels described herein may be configured to preferentially restrict the flow of certain gases or molecules through appropriate selection of the channel's cross-sectional area and length, among other factors. When there is no pressure differential between the two ends of a micro-channel, the flow is near zero and diffusion of gases is primarily affected by relative concentrations of the gases on either end of the microchannel. Gas flow through the micro-channel versus a micro-perforation of a known diameter can be measured at different pressures.

A micro-channel, or set of micro-channels, can be constructed and configured to have an equivalent flow of a micro-perforation from over 200 micrometers diameter to less than the lower extreme of 0.01 micrometers diameter, thereby overcoming the inherent structural limitations of micro-perforations with respect to minimizing and controlling OTR as well as the flow of various gases and molecules, including $CO_2$, $O_2$ and volatile compounds, for example.

Figure 2:
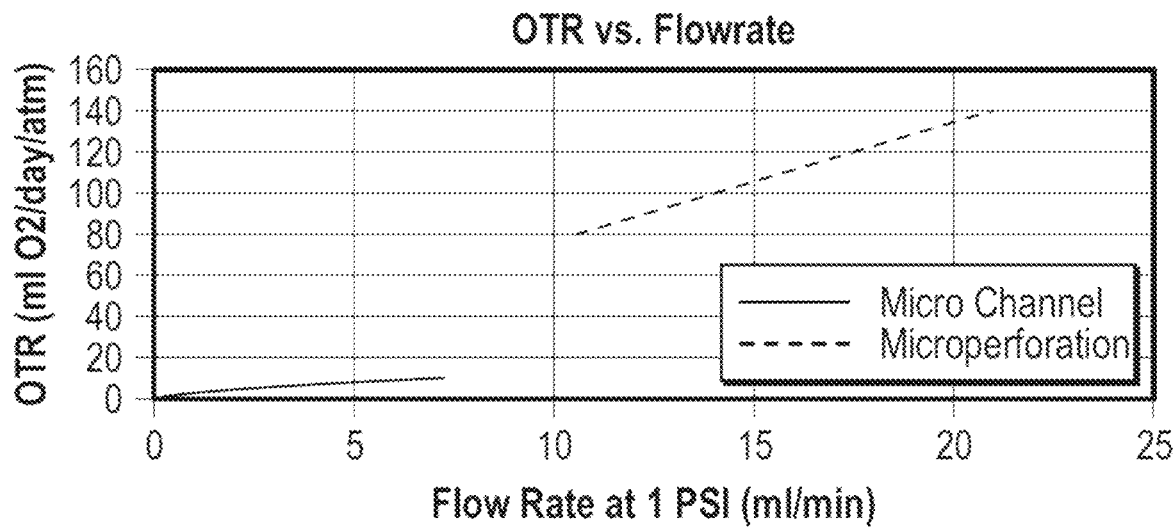
FIG. 2 shows a OTR versus flow rate graph for a microperforation vs. a microchannel.

FIG. 1 shows a graphical relationship between micro-channels, perforations, PSI and flow rate. This shows an example of channels that are capable of being designed to meet the venting requirements of a package requiring a lower overall OTR than is possible with the smallest feasible perforation diameter. As can be seen, microchannels can be designed to restrict the flow rate to much lower than is feasibly possible with a microperforation. FIG. 2 shows a relationship to both OTR and flow at given pressures can be drawn for both micro-perforations of various diameters and micro-channels of various flow rates. A micro-perforation with the equivalent flow as a micro-channel has an OTR that is 5 to 10 times higher.

FIG. 2 illustrates an advantage of a micro-channel having a lower OTR for a given flow rate, which can extend the shelf life of certain oxygen-sensitive products. The OTR of micro-channels is near zero while the product is off-gassing, since the diffusion of oxygen into the package is blocked by the counter flow of gas though the channels. Further, since the microchannels are always open yet dimensionally restricted, the outflow of gas is likewise prolonged and in the case of packaged coffee, nearly constant for months of shelf life, thereby creating a continual outflow to block oxygen from creeping back into the package.

The effective diameter and length of a channel can be set to affect the flow of the gas type that is preferentially allowed to pass. For example, carbon dioxide gas generally flows through tubes in gas column chromatography at a faster rate than oxygen or aromatic compounds. A channel that has a sufficiently small effective diameter or cross-sectional area and appropriate length will allow carbon dioxide though at a faster rate than oxygen or aromatic gas molecules. In this manner, the gas within the package can be controlled by the configuration of the microchannel device, for example retaining larger aromatic compounds of coffee inside and reducing oxygen infiltration while allowing a higher relative flow of carbon dioxide out of the package. If the smaller effective diameter or cross-sectional area of the channels is overly restrictive on flow and tends to allow too much pressure to build up inside the package, then additional channels may be added to the device while still maintaining the selective nature of the device towards different gases and compounds depending on the needs of the application.

Special constructions of a micro-channel device can also be designed. For example, the micro-channel can include a hydroscopic compound to effectively lower the OTR or gas transmission after pressure equalization, thus extending the shelf life of the packaged product. If the product that is off-gassing has a low water vapor concentration, the flow of gas can be used to keep a hydroscopic compound from absorbing water from the outside air into the package. When the flow of a dry gas stops water vapor from outside the package, the water can infiltrate the hydroscopic compound, swelling it and effectively sealing the channels.

Thus, micro-channels can be used to precisely control the OTR of a package for the extension of shelf life for fresh produce, enabling better control of OTR and other gases than micro-perforated film. In addition, micro-channels also have a lower tendency to clog due to particles or water vapor infiltration.

Venting microwavable frozen foods packaged in flexible packaging film can also benefit from the use of micro-channels in that the flow of steam can be tightly controlled during heating and have a lower OTR than micro-perforated film. The use of the micro-channel device will extend the viable shelf life for frozen, refrigerated, and other microwaveable products.

Modified Atmosphere Packaging (MAP) or hermetically sealed flexible packages transported over mountains or in airplanes can experience large changes in atmospheric pressure. These products may also benefit from micro-channels in that the pressure build-up and subsequent under-pressure when returning to higher atmospheric pressures is automatically handled by using the micro-channel device.

Palletization of products filled in flexible packaging may also benefit from micro-channels in that the air trapped in the package will be allowed to escape without compromising the package's OTR or allowing micro-organisms into the package.

Advantages to a denser pallet or container results in lower overall shipping costs since the number of packaged products on a pallet will be higher.

Flexible packages that incorporate the use of micro-channel devices may also see a reduction in the use of packaging film. The volume of the packaging can be reduced by eliminating the additional head space normally designed for product off-gassing. Packaging material and weight may also be reduced in that the overall package thickness can be reduced because of lower internal pressures enabled by the inventive micro-channel device, or by eliminating the need for additional film thickness to support the mechanical attachment of a traditional welded type valve.

The added benefit of keeping debris, liquid and micro-organisms out of a package is also seen with micro-channels. The area of a cross-section of the channel can be roughly the same as a micro-perforation but because of the channel length, the likelihood of contamination is much lower than a micro-perforated through-hole.

According to an embodiment, a laser can be used to create micro-channels by removing material in multilayer film constructions. Different materials reflect or absorb laser light of various frequencies (wavelengths) at different amounts. A material can absorb 100% of the laser light which affects the surface exposed to the laser light and not the material below. The other extreme is near 0% absorbency to laser light, which allows the laser light to pass through the material with no affect. In the ranges between the extremes, a level of heating comes from the surface exposed to the laser light to the other side of the material. Examples of suitable materials that absorb laser light may include but are not limited to polyethylene terephthalate (PET), ethylene vinyl alcohol polymer (EVOH) and acrylic. Examples of suitable materials that do not readily absorb laser light may include but are not limited to polyethylene (PE), high density polyethylene (HDPE), polypropylene (PP) and variations thereof such as bi-axially orientated polypropylene (BOPP).

Figure 3:
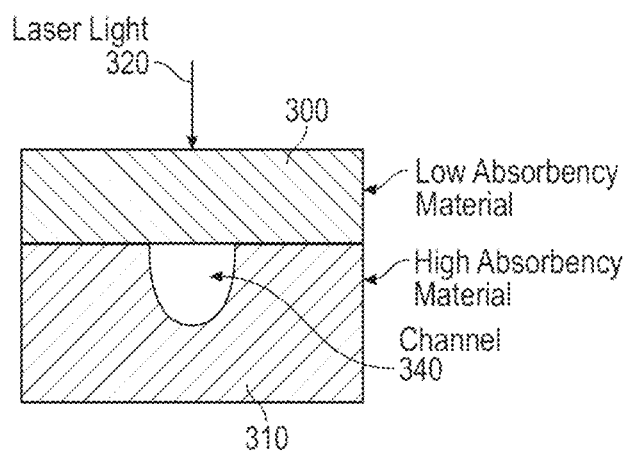
FIG. 3 shows a channel formed between a low laser absorbency layer and a high laser absorbency layer.

According to an example embodiment shown in FIG. 3, a low laser absorbency material 300 is layered over a high laser absorbency material 310 from the direction of incoming laser light 320. The material made in this way allows the higher absorbency material 310 to be ablated (vaporized) without directly affecting the first or lower absorbency material layer. This leaves a channel 340 formed where the laser has ablated the material.

Figure 4:
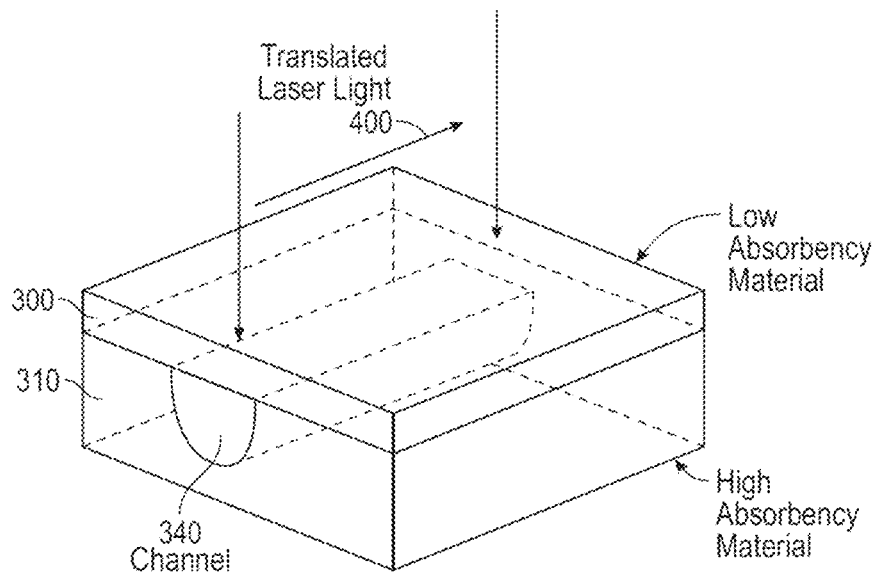
FIG. 4 shows how a channel can be formed from a translated laser light between two layers of a multilayer film.

FIG. 4 illustrates how the channel 340 may be formed along a path along which the laser beam is translated 400 to form the axis of the channel. The channel 340 is formed under the low absorbency material 300 in the surface of the high absorbency material 310 and is formed along the direction of translation 400 of the laser light.

The cross-sectional area of the channel 340 is determined and may be controlled by several factors. The depth of the channel 340 is affected mostly by the laser power and speed of the translation 400 and how the laser affects the relatively high absorbency material 310. The width of the channel is mostly affected by the focused spot size of the laser beam and less so by the material and speed.

Figure 5:
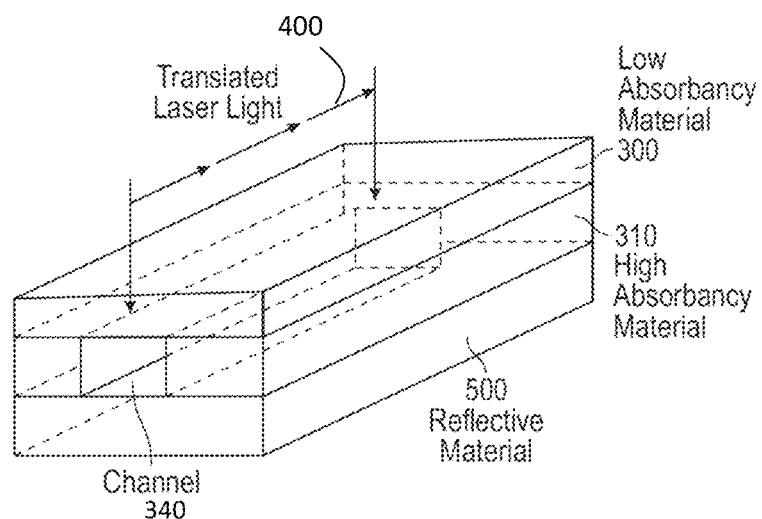
FIG. 5 shows an alternative embodiment where a channel is formed and constrained between two layers of a three-layer multilayer film.

FIG. 5 shows an alternative example embodiment, in which the depth of the channel can be controlled by layering a third material 500 with respect to the direction of the laser that is reflective or impervious to the frequency of the laser being used. The reflective nature of this third layer 500 allows the high absorbency material 310 to be completely removed between the first layer 300 and third layer 500. Examples of suitable materials that reflect or are impervious to a frequency of laser being used may include but are not limited to metallized materials, foils such as aluminum, or even HDPE or BOPP as a backstop.

Figure 6:
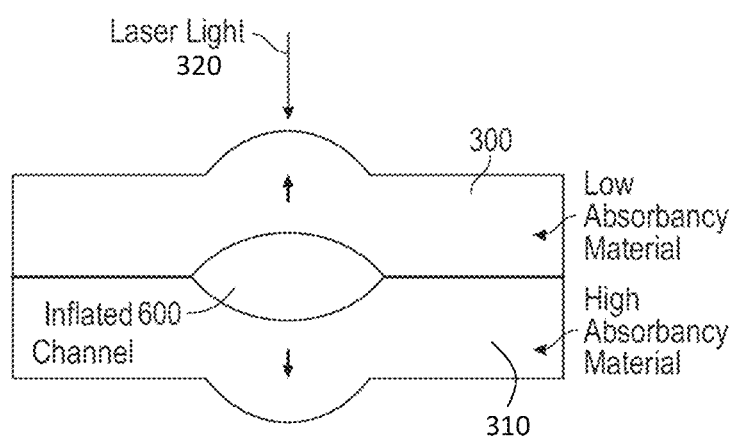
FIG. 6 shows another alternative embodiment in which an inflated channel is formed in a multilayer film.
Figure 7:
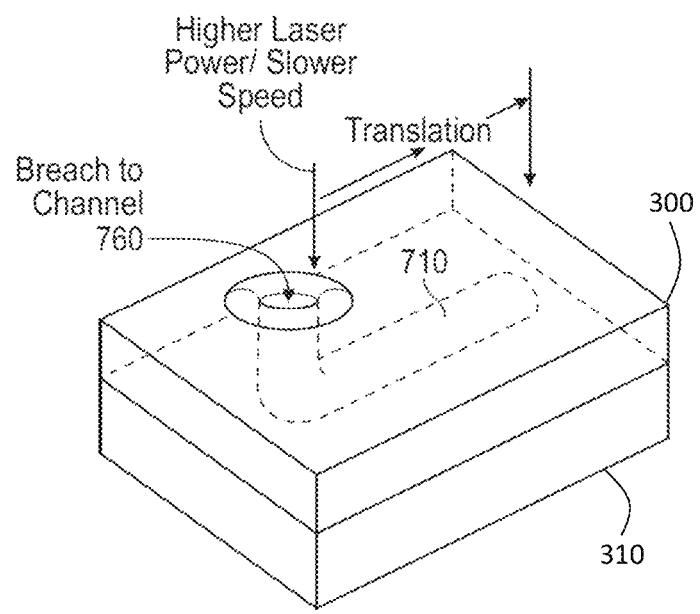
FIG. 7 shows how a breach can be formed to the channel.

With reference to FIGS. 6 and 7, forming a breach 760 or opening from the laser side surface of the film construction to the channel can be accomplished by increasing the laser power or decreasing the speed of the laser to the point that the additional power heats and either perforates the relative low absorbency film 300 or heat softens the film 300 to the point that the vapor generated by the ablation in the high absorbency layer 310 expands the low absorbency layer 300, or bursts though it. This forms an inflated channel 600 in areas where the low absorbency layer 300 has been softened and expanded. The high absorbency material 310 can also be expanded, as shown in FIG. 6, or can be inflated by the pressure caused by ablation of the high absorbency material.

The laser breach 760, which provides access to the channel 710, can be any of the channels in any of the embodiments described herein. The laser breach 760 forms an opening that allows gas to pass into and through the channel 710 and may face the internal contents of a package. The breach 760 can be formed by increasing the laser power at any point along the channel, causing punch-through of the low absorbency material 300 due to the increased laser power. Alternatively, the laser can be slowed or stopped at the point where the breach 760 is desired, to cause the breach 760 to be formed.

Figure 8:
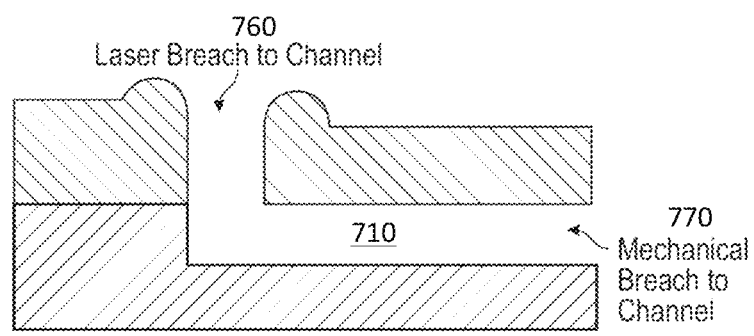
FIG. 8 illustrates how a mechanical breach to the channel can be formed.

Alternatively, the breach can be a mechanically cut breach 770 as shown in FIG. 8. The mechanical cutting can use a laser, or a punch or some other cutting structure. The dimensions of a micro-channel are roughly from a width of 1 micrometer to 1200 micrometers or larger, and a depth (height) of 1 to 1200 micrometers or more, but may be optimized for additional sizes according to the principles described herein and as may be appreciated by a person of skill in the art. The flow for a micro-channel is dependent on the cross-sectional area and length. For example, a channel of roughly 100 micrometers wide by 25 micrometers in depth and 7 millimeters in length has a flow rate of 1 ml of air per minute at about 6,900 Pascal (1 PSI) pressure difference from one end of the channel to the other. A device that has two or more channels is additive to the two independent channels' flow rates. OTR of channels is also additive.

Figure 9:
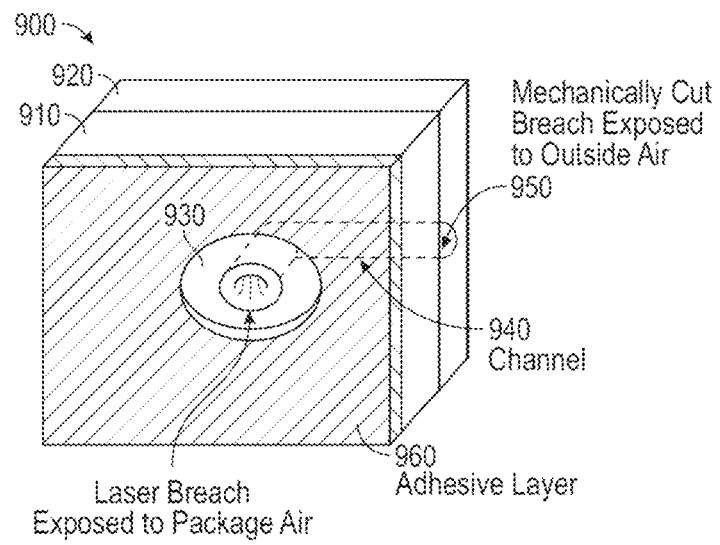
FIG. 9 shows how the channel structure can be formed in a multilayer structure with an adhesive layer and can be used as a patch on a package.

The micro-channels can be created directly on the packaging film. However, an example preferred method comprises a device as shown in FIG. 9, constructed of a multilayer film 900 including a low absorbency material 910 and a higher absorbency material 920. The film includes at least one breach and the channel. However, as may be appreciated in the art, other multilayer structures may be utilized incorporating different or additional layers with various functions. In one example, HDPE-PET-Foil-PET may be layered, with HDPE as the low absorbancy material 910, PET as the laser-ablated higher absorbancy material 920 for channel formation, foil as the reflective backstop (such as layer 500 shown in FIG. 5), and the last PET layer as a structural or stiffening layer. Other possibilities may include HDPE-EVOH with HDPE as low absorbancy material 910 and thick EVOH as the laser-ablated higher absorbancy material 920, the EVOH thickness being sufficient such that the laser does not create a breach through the other side of the film. Alternatively, the multilayer structure may comprise HDPE-EVOH-HDPE wherein the thinner EVOH layer is ablated to form the channel. In some embodiments, the foil layer itself may be ablated to form a channel using an appropriate laser wavelength (e.g. shortwave fiber laser) thus enabling thinner materials used in the construction of the device or package.

In the example FIG. 9 embodiment, there is a laser-formed breach 930 exposed to internal package air, and a mechanically cut breach 950 exposed to outside air, with channel 940 extending therebetween. This multilayer film 900 may include an adhesive layer 960, thus forming an adhesive patch with the channel formed therein which can be applied onto a packaging film. The adhesive layer 960 may be constructed to isolate the breach(es) such as laser breach 930 to only internal package air, protecting it from exposure to the outside air other than through channel 940, thus forming gas-tight communication between the package interior and the channel. Further, although only one example channel 940 with breaches on each end is shown, it may be appreciated that any number of channels and breaches may be formed in multilayer film 900 configured for the particular needs of an application. Further, though the term "air" is used with reference to these embodiments, it is not intended to be limited to the actual conditions and make-up of atmospheric air, but may be generally understood as "environment," such as "internal package environment" versus "external package environment."

Figure 10:
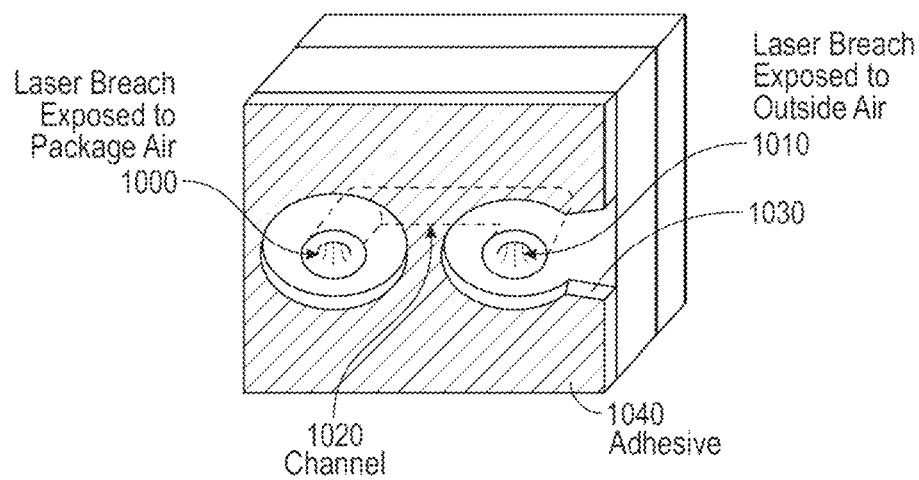
FIG. 10 illustrates an alternative design in which both channel breaches are presented on the same surface of a multilayer film.

FIG. 10 shows an alternative embodiment where both breaches 1000 and 1010 are laser formed, and the channel 1020 between the breaches is also laser formed. The breach 1000 is positioned to be exposed to the internal package air.

The breach 1010 is connected to breach 1000 by channel 1020. Breach 1010 is exposed to the outside air external to the package by virtue of a cut-out portion 1030 in the adhesive layer 1040. In this way, the breach 1000 is located where it will be exposed to the internal package air, which can be vented through the channel 1020 to the breach 1010 and then through cut-out portion 1030 to escape into the outside air environment. The gases in the package may be exposed to the breach 1000 isolated by the adhesive layer 1040 by a perforation via laser or mechanical punch in the packaging film within the adhesive perimeter around the breach.

Figure 11A:
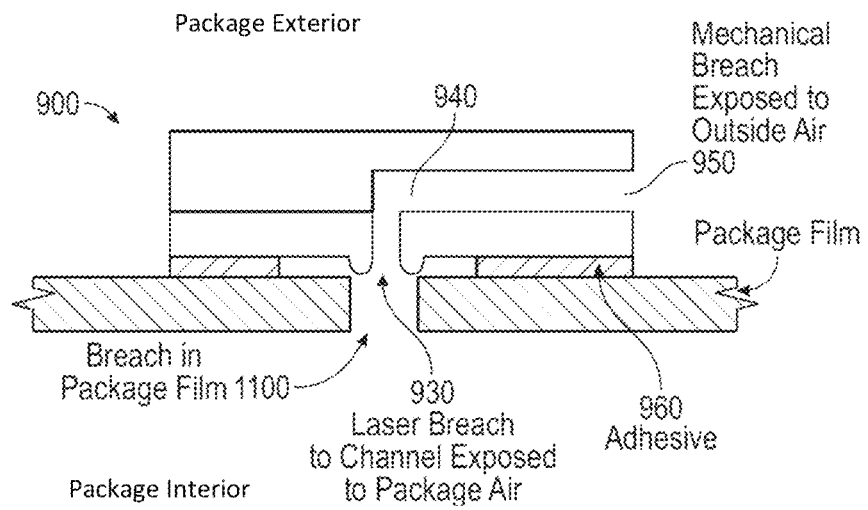
FIG. 11A shows a cross section of FIG. 9 showing how the patch can be affixed to and function on a package surface.

FIG. 11A shows a cross-section illustrating how the multilayer structure 900 of FIG. 9 can be placed over a breach 1100 or opening in the packaging film. The multilayer structure 900 must be placed with its breach 930 in a location in general registry with the breach 1100 in the package film so that the two breaches are at least generally aligned to allow for gases to flow therethrough. The adhesive 960 seals around the two breaches 1100 and 930 to ensure complete gas-tight isolation from outside air external to the package content environment so that channel 940 is the only route through which gas may transfer. The breach 1100 in the package film communicates with channel 940 and exhausts through the mechanically cut breach 950 to the outside air.

In this manner the packaging film used for the construction of the package is independent of the film construction utilized on the patch with channels and breaches. This is advantageous as the multilayer film that the patch is made of is generally more expensive than many common packaging films.

Figure 11B:
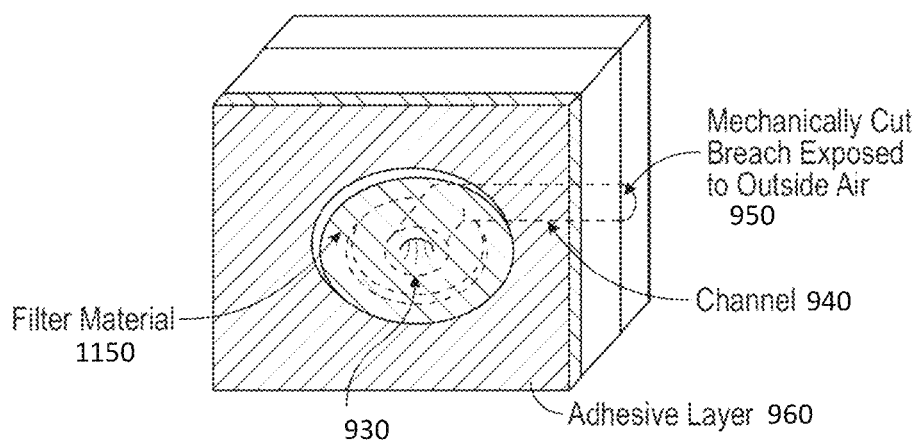
FIG. 11B shows an alternative embodiment where a filter material is included in the laser breach.

FIG. 11B illustrates an alternative embodiment where a filter can be incorporated into the device 900 between the breach in the packaging film (such as 1100 in FIG. 11) and the interior channel 940. This filter 1150 operates to block debris from entering the channel 940 and blocking or restricting the flow of gases through the device 900.

In one embodiment, the filter 1150 can be constructed of a hydrophobic material that blocks liquid from passing through while allowing vapor and gas to pass. In this manner the channels 940 would remain free of liquid, since the liquid could otherwise prevent proper function.

Figure 11C:
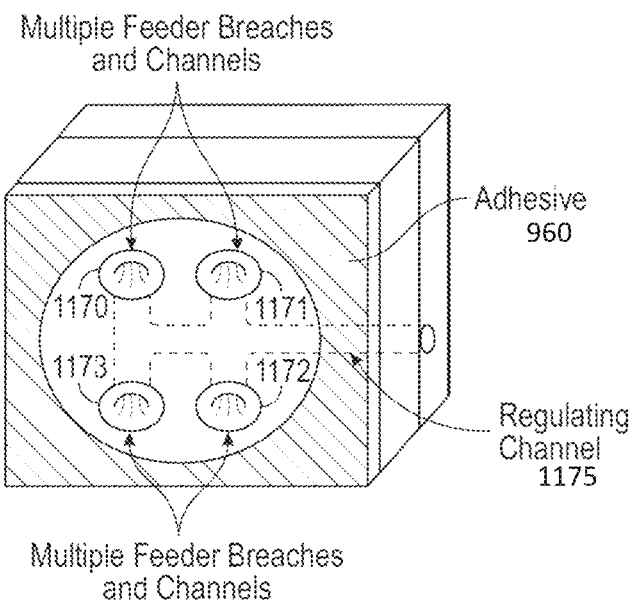
FIG. 11C shows an alternative embodiment including multiple feeder breaches in communication with a single channel.

FIG. 11C illustrates an embodiment where multiple "feeder" channels 1170, 1171, 1172 and 1173 can be used to allow gas to enter a channel 1175 that is designed to regulate the flow and OTR of the device. The multiple entry channels could be larger in effective diameter or cross-sectional area and shorter in length than the regulating channel 1175, and would not affect the overall flow and OTR characteristics of the device and would serve as a redundancy if any of the feeder channels became blocked. These channels can have a tight crossing pattern that serve as an area for debris to settle before being allowed into the regulating channel 1175, since debris in the regulating channel 1175 can affect performance.

Another example embodiment may incorporate an airway that seals after being exposed to water vapor or humidity. The gases that are generated by some products have very low humidity. If these products off-gas for a given period after packaging (i.e. fresh roasted coffee), then venting to prevent bloating is not necessary after this given period. The ability to vent after the period of off-gassing may allow oxygen to enter the package and shorten the shelf life of the product. This embodiment seals the venting after allowing the venting to continue for a time.

Figure 12:
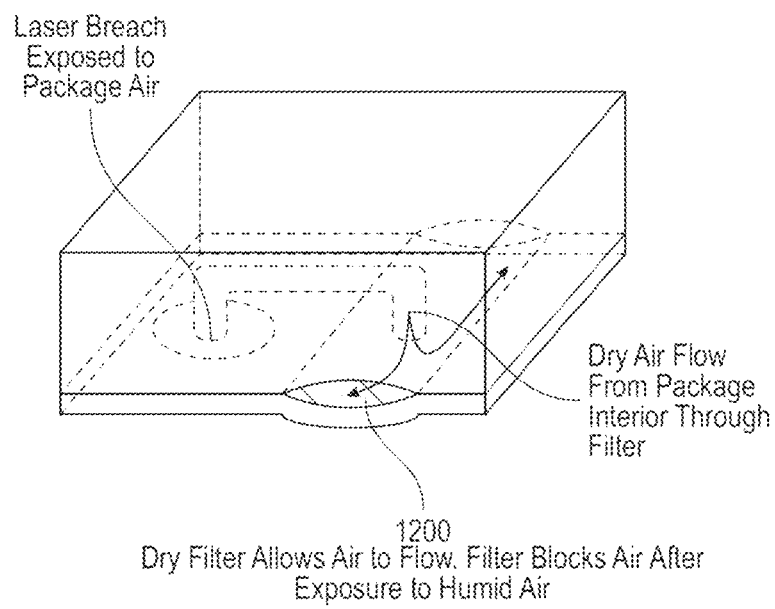
FIG. 12 shows an alternative embodiment including a dry filter used in the channel breach.

FIG. 12 illustrates a device that forces off-gas to flow thru a "dry filter" 1200, where the filter is impregnated with a hydroscopic compound. This dry filter 1200 would not alter flow while the gases are below a water vapor or humidity level that would affect the hydroscopic compound. After the off-gassing cycle is complete the dry flow of air would no longer isolate the hydroscopic compound from the higher humidity atmosphere. When exposed to atmospheric humidity, the compound would swell, liquefy or dissolve in adsorbed water. In each of these cases, the filter would effectively block passage of atmospheric air to the interior of the package. Blocking outside air from the interior of the package would extend the shelf life of the product. Caution should be taken to prevent the device from absorbing humidity prior to filling and dry off-gassing from maintaining functionality.

Example Manufacturing Method

An example method for forming the patches is described herein.

A first step is to manufacture the adhesive patches which contain the breaches and channels created with laser technology. The patches come in a roll format with a silicon coated carrier liner protecting the adhesive. Then the packaging film is mechanically or laser perforated in registration with the print and the adhesive patch is applied to the outer surface of a packaging film, usually in registration with the mechanical or laser perforation on the packaging film, while the web of packaging film is moving. An inline mechanical or laser perforator and a label applicator are used to perform these two steps. A label applicator usually consists of a label unwind, print registration sensor, label removal mechanism, application roller, and liner rewind. The roll of patches runs through the label applicator, the patches get released and applied to the outer surface of the packaging film, and the carrier liner is rewound. The packaging film also comes in a roll format, and therefore is unwound and rewound continuously. The packaging film has printed registration marks to allow for accurate perforation and application of the patches in registration with the printed graphics on the packaging film. Once the patch is applied, the moving web of packaging film is rewound into a finished roll. The finished roll is shipped to the customer's packaging line where usually the customer's product is place in a vertical form fill sealing machine to create the final bag.

Example Method—Gas Flow and OTR

Experimental micro-channels with breaches as described above were formed having various cross-sectional areas and lengths in HDPE-PET-Foil-PET multilayer film patches. The mechanical breaches were created with a razor blade at varying lengths from the initial laser breach to create multiple samples having different lengths for a given cross-sectional area. Adhesive was fixed onto the HDPE layer surface while leaving an adhesive-free zone around the laser breach to channel, and then the patches were affixed to a PET film for handling and testing to simulate a package film surface, the film having holes aligned with each laser breach of each patch.

To determine gas flow through each patch having a microchannel or microchannels, a selected patch on the PET film was positioned such that the orifice of a 25 cc pressure chamber was aligned and in communication with the laser breach and microchannel of the patch and sealed using an adhesive to make the system gas tight to outside air. The pressure of the chamber was raised to over 1 PSI to start the flow of gas through the patch microchannel, and then timed from 1 PSI (P1) until the monitored pressure dropped to 0.99 PSI (P2). Based on the known volume of gas that escaped during the given time interval, a flow rate was then determined. To determine the gas flow rate of a particular gas of interest, the 25 cc chamber was flushed and pressurized with that particular gas, such as air or pure $CO_2$.

To determine OTR through each patch having a microchannel or microchannels, a selected patch on the PET film was positioned such that the orifice of a nitrogen-flushed chamber was aligned and in communication with the laser breach and microchannel of the patch and sealed using an adhesive to make the system gas tight to outside air. After sealing the patch onto the nitrogen-flushed chamber, an OxyDot (O2xyDot®) was used in the chamber to measure the oxygen transmission rate through the patch and into the nitrogen flushed chamber over time and under standard atmospheric pressure (Atm).

Example Results—Gas Flow and OTR

Samples patches were prepared according to the method described above, having different cross-sectional areas and lengths. Aspect ratios were calculated from the maximum height/depth of each channel divided by the maximum width, since the microchannels were often of a generally rectangular cross-sectional geometry. This cross-sectional geometry of the channel samples was also used to determine the appropriate formula for the area calculation, e.g. rectangular versus circular areas.

FIGS. 13-17 were generated based upon the data in TABLE 1 above.

Figure 13:
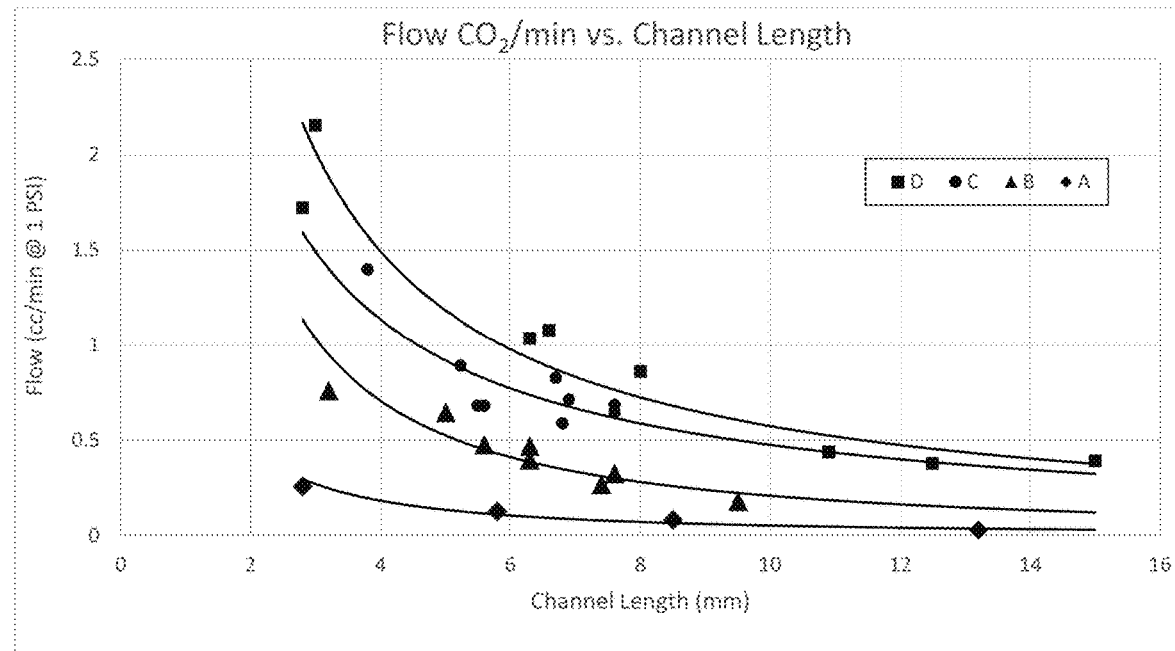
FIG. 13 is a graph showing a relationship between flow of carbon dioxide and channel length for channels of different cross-sectional areas.

As shown in FIG. 13 for the flow rate of $CO_2$, channels having a larger cross-sectional area had a larger flow rate of $CO_2$ for all given lengths of channels, and smaller cross-sectional area had a smaller flow-rate. Channels having a longer length for all given cross-sectional areas had a slower flow rate of $CO_2$, while shorter length channels had a faster flow-rate of $CO_2$. As may be appreciated from TABLE 1 and the findings herein, by configuring the microchannel of the present invention with an appropriate cross-sectional area and length, it was thus shown that the $CO_2$ flow at 1 PSI may be controlled to a range of about 0.03 cc/min to about 35 cc/min, but is also enabled and preferentially controlled from about 0.010 cc/min to about 100 cc/min, and most preferably from about 0.001 cc/min to about 1000 cc/min.

Figure 14:
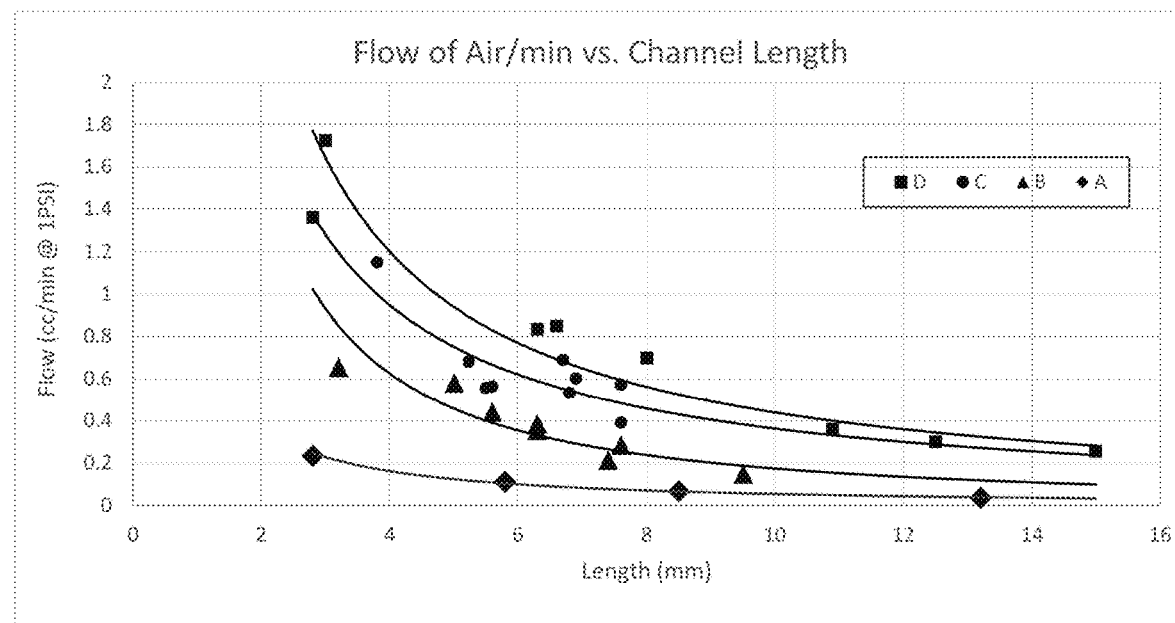
FIG. 14 is a graph showing a relationship between flow of air and channel length for channels of different cross-sectional areas.

As shown in FIG. 14 using channels with the same dimensions, air flowed comparatively slower than $CO_2$ for any of the channels, but otherwise showed the same general phenomenon of fast or slow flow based on cross-sectional area and length of channels, wherein higher cross-sectional areas increased flow along with shorter channel lengths. However, interestingly, at or near 1 mm length channels, it was found that $CO_2$ and air flowed at almost the same rate.

TABLE 1

| Sample Patch | Aspect Ratio | Cross-sectional area (μm$^2$) | Length (mm) | CO2 flow (cc/min) @ 1 PSI | Air flow (cc/min) @ 1 PSI | OTR (ccO2/day/Atm) | Ratio of Flow of CO2/OTR |
|---|---|---|---|---|---|---|---|
| A | 0.31 | 1660 | 13.2 | 0.028 | 0.036 | 0.120 | 0.24 |
| A | 0.31 | 1660 | 2.8 | 0.258 | 0.233 | x | x |
| A | 0.31 | 1660 | 5.8 | 0.126 | 0.113 | 0.340 | 0.37 |
| A | 0.31 | 1660 | 8.5 | 0.083 | 0.069 | 0.230 | 0.36 |
| B | 0.20 | 1872 | 3.2 | 0.76 | 0.66 | 1.32 | 0.58 |
| B | 0.20 | 1872 | 6.3 | 0.40 | 0.36 | 0.68 | 0.59 |
| B | 0.20 | 1872 | 5.6 | 0.48 | 0.44 | 0.73 | 0.65 |
| B | 0.20 | 1872 | 7.6 | 0.33 | 0.28 | 0.60 | 0.54 |
| B | 0.20 | 1872 | 9.5 | 0.18 | 0.15 | 0.31 | 0.58 |
| B | 0.20 | 1872 | 5 | 0.65 | 0.58 | 0.90 | 0.72 |
| B | 0.20 | 1872 | 7.4 | 0.27 | 0.21 | 0.52 | 0.52 |
| B | 0.20 | 1872 | 6.3 | 0.47 | 0.39 | 0.73 | 0.64 |
| C | 0.31 | 4060 | 5.23 | 0.89 | 0.68 | 0.79 | 1.13 |
| C | 0.31 | 4060 | 6.8 | 0.59 | 0.53 | 0.60 | 0.99 |
| C | 0.31 | 4060 | 5.5 | 0.68 | 0.56 | 0.73 | 0.94 |
| C | 0.31 | 4060 | 5.6 | 0.68 | 0.56 | 0.70 | 0.97 |
| C | 0.31 | 4060 | 7.6 | 0.65 | 0.39 | 0.48 | 1.35 |
| C | 0.31 | 4060 | 3.8 | 1.40 | 1.15 | 1.14 | 1.23 |
| C | 0.31 | 4060 | 6.7 | 0.83 | 0.69 | 0.75 | 1.10 |
| C | 0.31 | 4060 | 6.9 | 0.71 | 0.60 | 0.67 | 1.07 |
| C | 0.31 | 4060 | 7.6 | 0.69 | 0.57 | 0.60 | 1.14 |
| D | 0.29 | 5133 | 6.6 | 1.08 | 0.85 | 0.95 | 1.13 |
| D | 0.29 | 5133 | 3 | 2.16 | 1.72 | 1.69 | 1.28 |
| D | 0.29 | 5133 | 8 | 0.86 | 0.70 | 0.74 | 1.16 |
| D | 0.29 | 5133 | 6.3 | 1.03 | 0.83 | 0.84 | 1.23 |
| D | 0.29 | 5133 | 2.8 | 1.72 | 1.36 | 3.37 | 0.51 |
| D | 0.29 | 5133 | 10.9 | 0.44 | 0.36 | 0.42 | 1.05 |
| D | 0.29 | 5133 | 12.5 | 0.38 | 0.30 | 0.62 | 0.61 |
| D | 0.29 | 5133 | 15 | 0.39 | 0.26 | 0.34 | 1.15 |
| E | 0.35 | 13220 | 113 | 0.196 | 0.157 | 0.143 | 1.37 |
| E | 0.35 | 13220 | 100 | 0.232 | 0.184 | x | x |
| E | 0.35 | 13220 | 58 | 0.255 | 0.206 | x | x |
| E | 0.35 | 13220 | 35 | 0.31 | 0.25 | x | x |
| E | 0.35 | 13220 | 14.5 | 0.488 | 0.42 | x | x |
| F | 0.06 | 74504 | 110 | 2.69 | 2.08 | 0.701 | 3.84 |
| G | 0.16 | 96250 | 187 | 34.48 | 25.9 | 2.21 | 15.60 |
| 73.5 μm perf | 1.00 | 4241 | 0.02 | 14.8 | 25.5 | 95.5 | 0.15 |
| 100 μm perf | 1.00 | 7850 | 0.02 | 51.72 | 56.22 | 155 | 0.33 |

Figure 15:
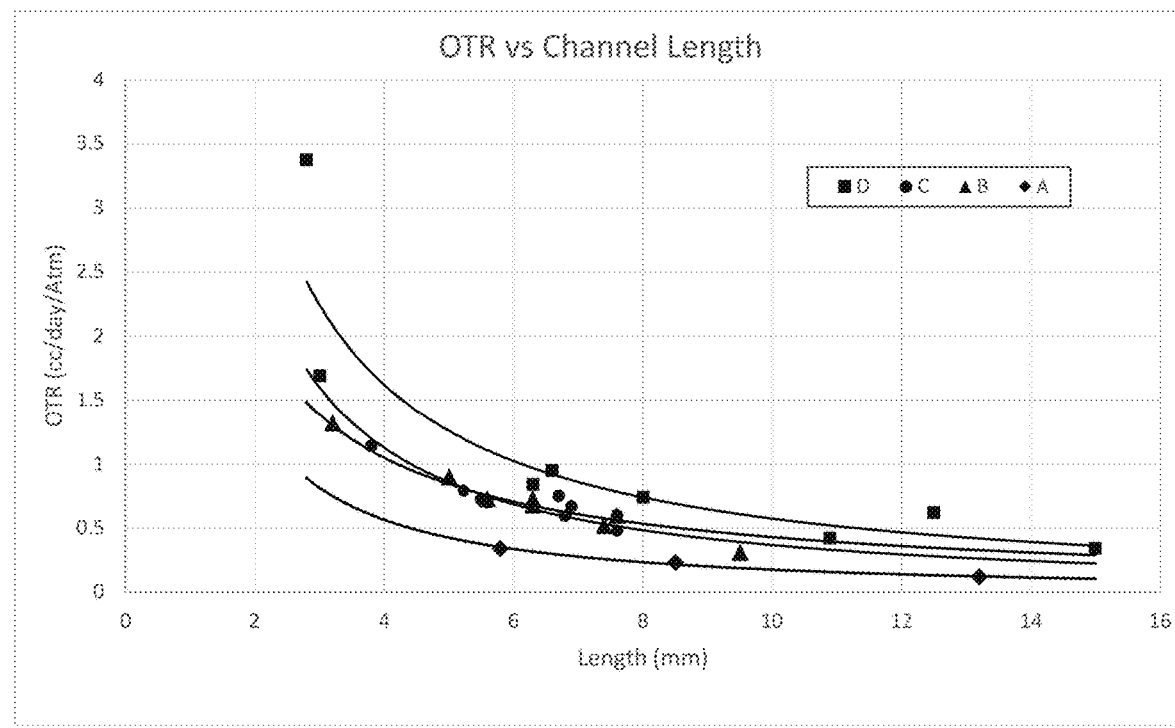
FIG. 15 is a graph showing a relationship between OTR and channel length for channels of different cross-sectional areas.

As shown in FIG. 15, it was found that OTR followed the same basic trend as gas flow for $CO_2$ and air, but with OTR being more dependent on length of the channels and less dependent on cross-sectional area.

Figure 16:
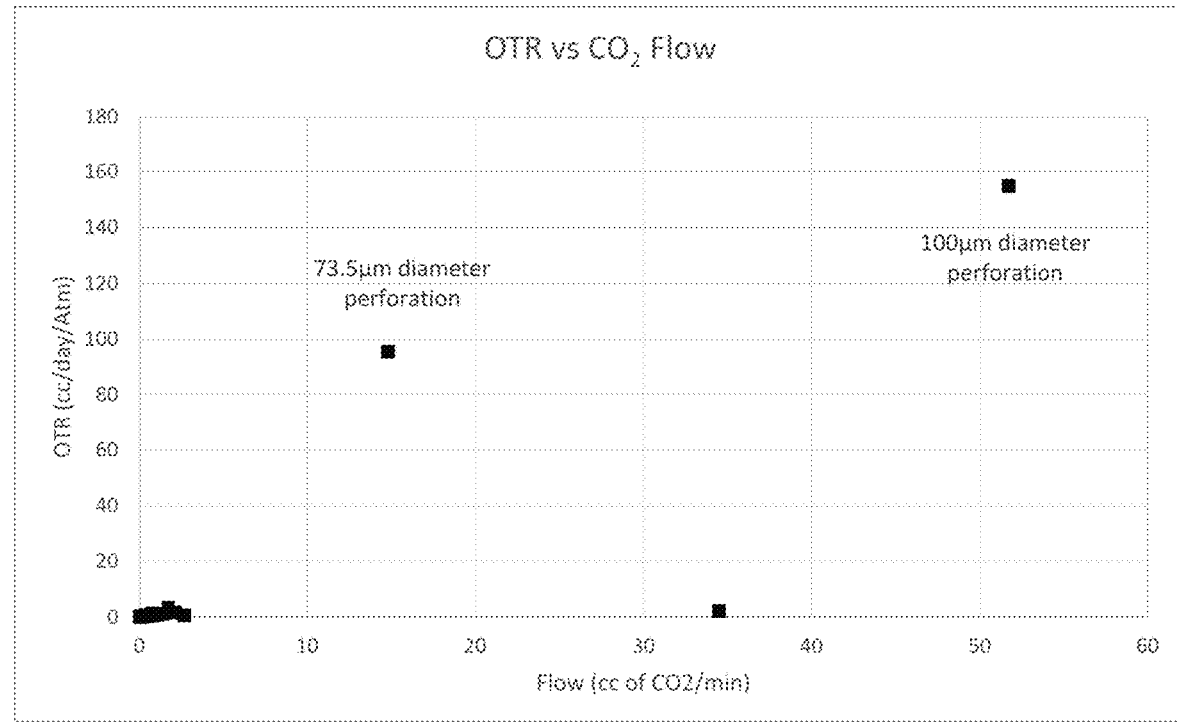
FIG. 16 is a graph showing a relationship between OTR and flow of carbon dioxide for the inventive channels versus prior art microperforations of different sizes.
Figure 17:
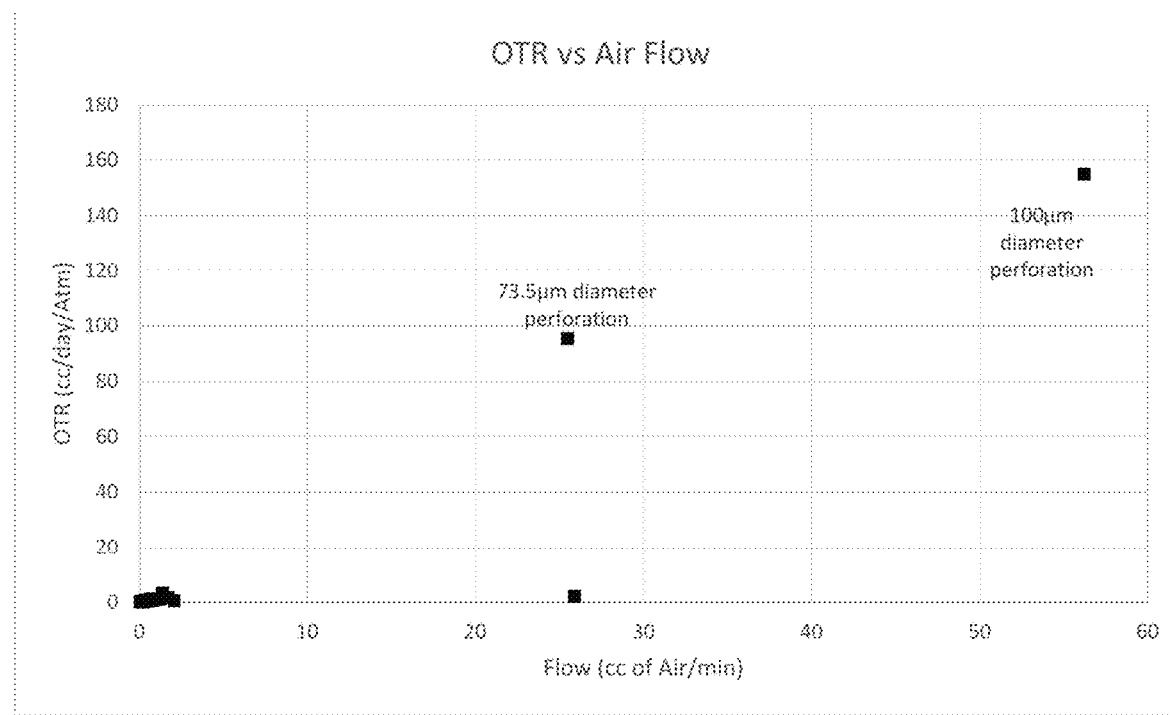
FIG. 17 is a graph showing a relationship between OTR and flow of air for the inventive channels versus prior art microperforations of different sizes.

FIGS. 16 and 17 are plots of all sample patches A through G, as well as prior art comparison microperforations having 73.5 µm and 100 µm diameters. As shown, the OTR remains extremely low for all the sample patches regardless of the flow rate of either $CO_2$ (FIG. 16) or air (FIG. 17), in comparison with prior art microperforations. As shown in FIG. 17 and the data of TABLE 1, for example, for a given flow rate of air, the 73.5 µm perforation had an OTR of more than 40 times the equivalent flow in channel G.

Performance of the microchannels was also indicated by taking the ratio of the flow of $CO_2$ divided by the OTR (Ratio of Flow of CO2/OTR) as shown in TABLE 1. By configuring the microchannel of the present invention with an appropriate cross-sectional area and length, it was shown that the $CO_2$/OTR ratio may be controlled to a range of about 0.2 to about 16, but is also enabled and preferentially controlled from about 0.2 to about 50, and most preferably from about 0.1 to about 100. This ratio is a useful indicator for most packaged coffee and foods, including living produce and fermenting goods, because these products typically off-gas $CO_2$ which must be vented to an appropriate level, while also controlling the amount of OTR to limit spoiling of the goods.

Example Method—Headspace Analysis (Configuring the Device for Packaged Coffee)

Freshly roasted ground coffee and whole bean coffee was bagged with the adhesive experimental patches on the package film covering an orifice in the film such that gas-tight communication was established between the package contents and the channels in the patches. The length and cross-sectional areas of the channels of each patch were configured for high or low gas flows to test for optimal configuration (as shown in TABLE 2 below), and each patch was constructed having two channels with identical dimensions. A gas analyzer was used to take gas samples from the headspace of each bag over 120 days (timed from date of roasting and packing) to analyze the percentage of $CO_2$ and $O_2$.

Example Results—Headspace Analysis (Configuring the Device for Packaged Coffee)

The results of the headspace analysis of the packaged coffee for each configured patch (having channels) is presented in TABLE 3 below.

TABLE 3

| Days | 3 oz Ground High Flow | | 3 oz Ground Low Flow | | 1 lb Whole Bean High Flow | | 1 lb Whole Bean Low Flow | |
|---|---|---|---|---|---|---|---|---|
| | $O_2$ % | $CO_2$ % | $O_2$ % | $CO_2$ % | $O_2$ % | $CO_2$ % | $O_2$ % | $CO_2$ % |
| 7 | 6.3 | 54.6 | 6.1 | 56.1 | x | x | x | x |
| 30 | 5.1 | 53.7 | 4.6 | 56.6 | 3.4 | 76.1 | 0.9 | 91.6 |
| 60 | 5.5 | 48.8 | 4.1 | 55.1 | 0.7 | 88.0 | 0.3 | 90.0 |
| 90 | 6.5 | 39.9 | 4.5 | 51.4 | 5.9 | 55.3 | 1.9 | 73.1 |
| 120 | 6.5 | 41.6 | 4.7 | 49.4 | 12.4 | 32.2 | 0.3 | 87.5 |

The data from TABLE 3 was used to generate the graphs of FIGS. 18-21.

Figure 18:
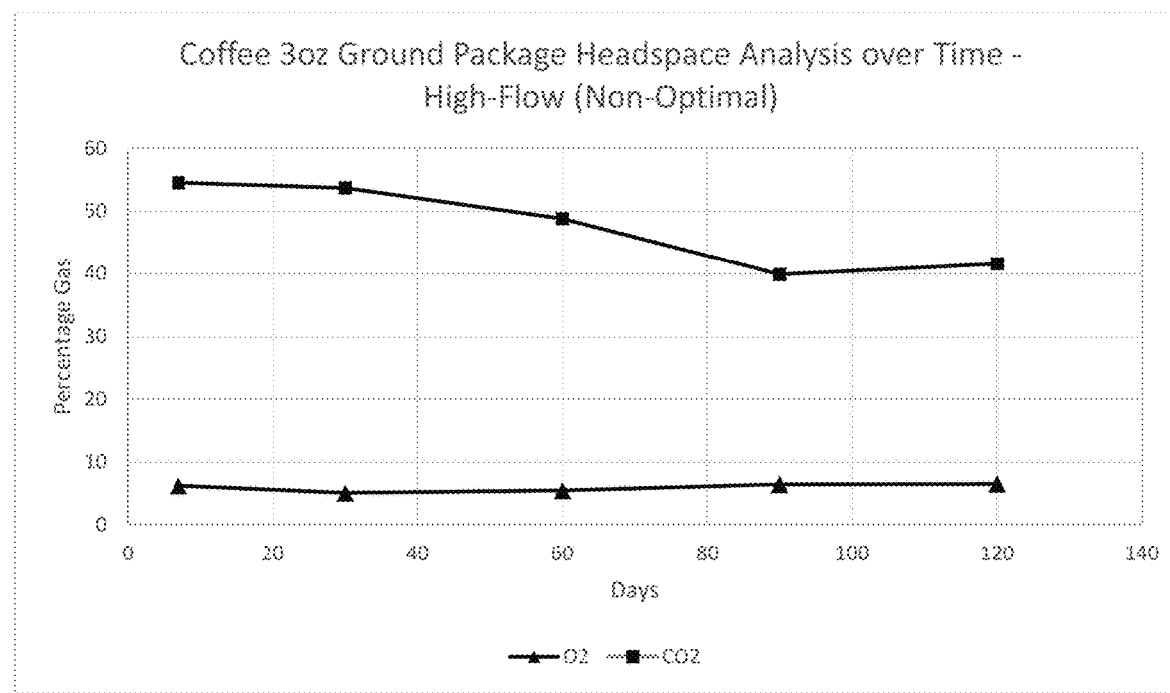
FIG. 18 is a graph showing the 120-day headspace analysis of oxygen and carbon dioxide levels for 3 oz ground packaged coffee using a channel having high-flow characteristics.

FIG. 18 shows the data for the 3 oz ground coffee bag using the high flow microchannel patch. Based on the results, although the microchannel was able to successfully vent the built-up $CO_2$ inside of the package, it allowed a slight rising of oxygen levels into the bag over the 120-day test period, which was non-optimal, though still better than any microperforation could achieve.

Figure 19:
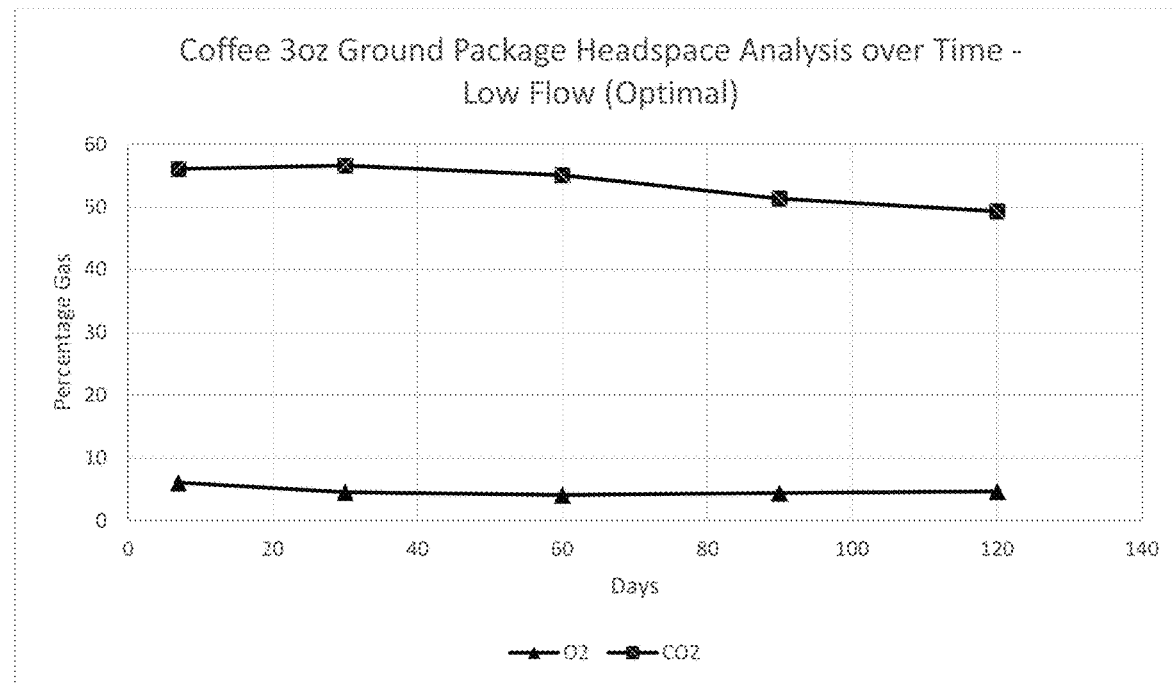
FIG. 19 is a graph showing the 120-day headspace analysis of oxygen and carbon dioxide levels for 3 oz ground packaged coffee using a channel having low-flow characteristics.

FIG. 19 shows the data for the 3 oz ground coffee bag using the low flow microchannel patch. Based on the results, the microchannel was able to successfully maintain proper venting of the built-up $CO_2$ inside of the package, while maintaining oxygen levels to a stably low level below 5% throughout the 120-day test period, except for day 7 when some residual oxygen was still venting out of the package with the $CO_2$ off-gassing.

Figure 20:
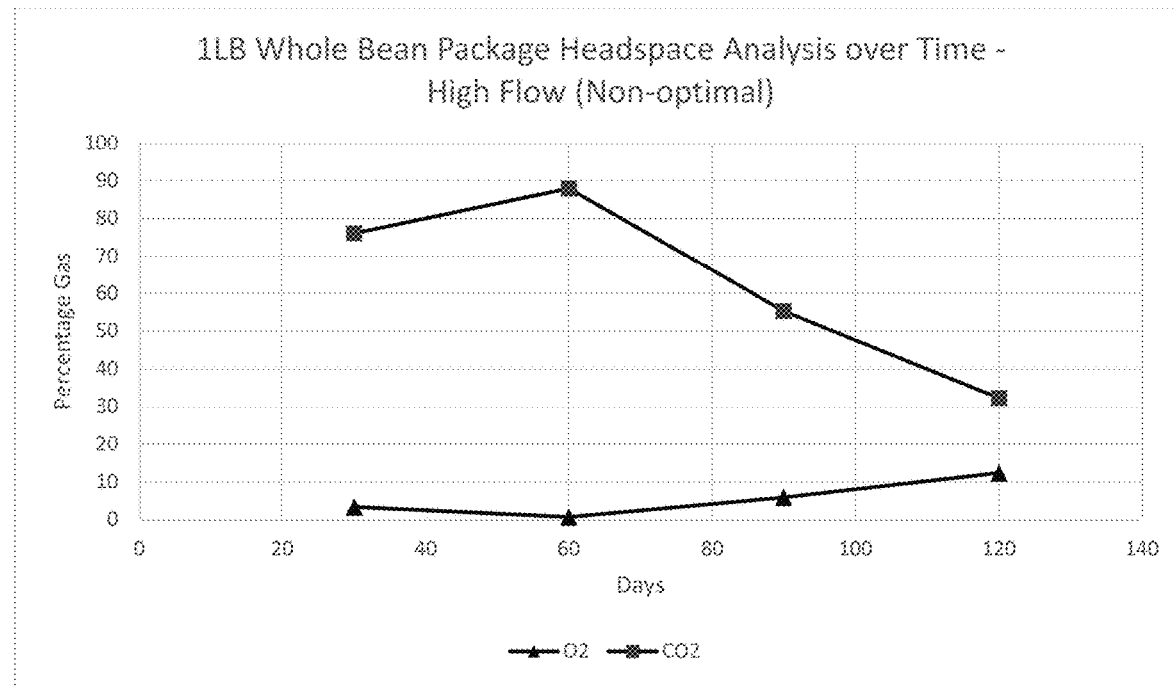
FIG. 20 is a graph showing the 120-day headspace analysis of oxygen and carbon dioxide levels for one pound whole bean packaged coffee using a channel having high-flow characteristics.

FIG. 20 shows the data for the 1 lb whole bean coffee bag using the high flow microchannel patch. Based on the results, although the microchannel was able to successfully vent the built-up $CO_2$ inside of the package, it allowed a slight rising of oxygen levels into the bag over the 120-day test period, which was non-optimal, though still better than any microperforation could achieve.

TABLE 2

| Sample Patch | Aspect Ratio | Cross-sectional area (µm²) | Length (mm) | CO2 flow (cc/min) @ 1 PSI | Air flow (cc/min) @ 1 PSI | OTR (ccO2/day/Atm) | Ratio of Flow of CO2/OTR |
|---|---|---|---|---|---|---|---|
| 3 oz Ground High Flow Patch | 0.14 | 3388 | 7 mm | 0.288 | 0.107 | 1.02 | 0.223 |
| 3 oz Ground Low Flow Patch | 0.14 | 3388 | 10 mm | 0.173 | 0.131 | 0.577 | 0.300 |
| 1 lb Whole Bean High Flow Patch | 0.16 | 9477 | 5.5 mm | 6.08 | 4.43 | 6.93 | 0.877 |
| 1 lb Whole Bean Low Patch | 0.17 | 4901 | 6.8 mm | 2.25 | 1.32 | 4.03 | 0.558 |

Figure 21:
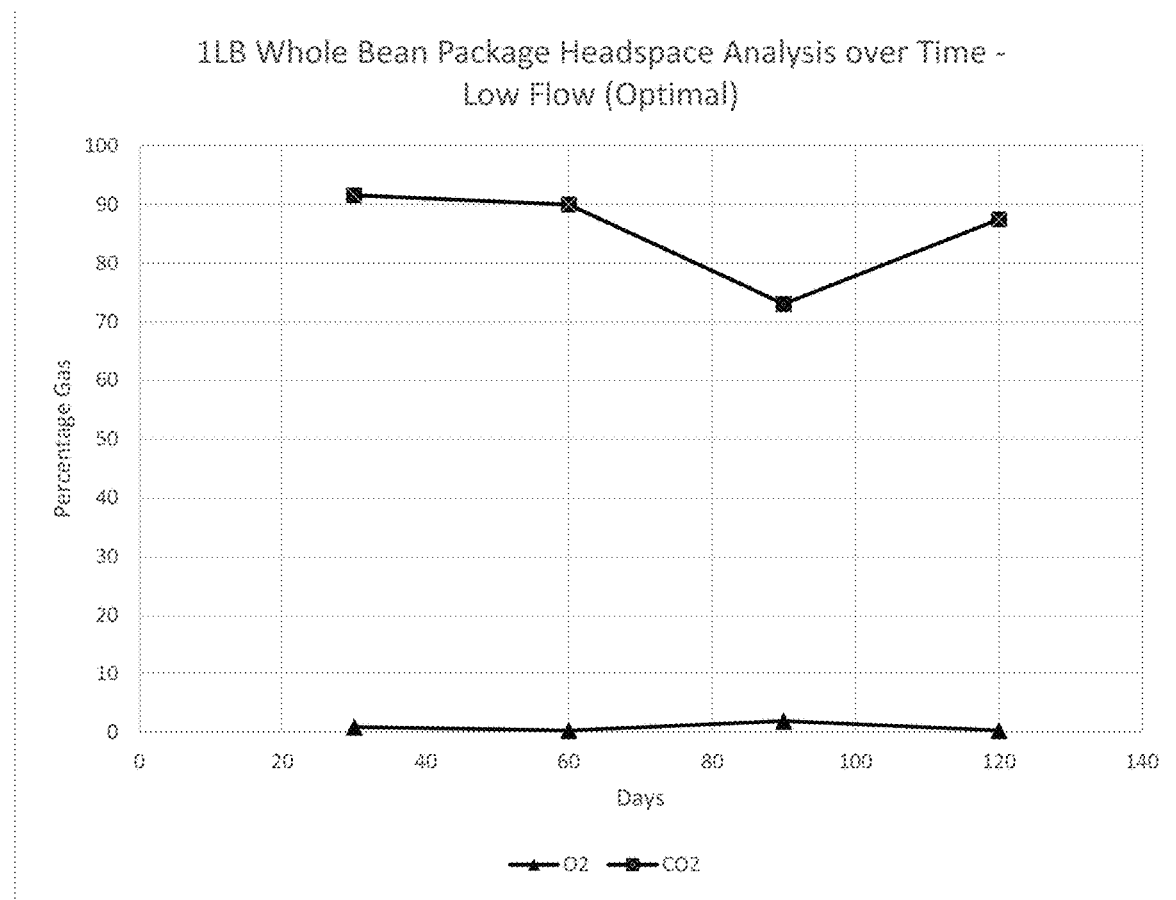
FIG. 21 is a graph showing the 120-day headspace analysis of oxygen and carbon dioxide levels for one pound whole bean packaged coffee using a channel having low-flow characteristics.

FIG. 21 shows the data for the 11b whole bean coffee bag using the low flow microchannel patch. Based on the results, the microchannel was able to successfully maintain proper venting of the built-up $CO_2$ inside of the package, while maintaining oxygen levels to a stably low level below 5% throughout the 120-day test period.

Fine-tuning of pressure release as well as selective control over gas flow in and out of a package is made possible from the foregoing disclosures and examples provided herein, enabling a person of ordinary skill in the art to configure a channel having the appropriate cross-sectional area and length to meet the unique specifications and requirements for each type of packaged good. Although a wide range of dimensions of the channel may be constructed, examples of suitable dimensions include but are not limited to a cross-sectional area preferably between about 1,500 $\mu m^2$ to about 1 $mm^2$, or between about 1,500 $\mu m^2$ to about 100,000 $\mu m^2$. Suitable lengths include but are not limited to preferably about 1 mm to about 100 cm, or about 3 mm to about 200 mm.

For example, in the case of coffee, the methods and examples herein demonstrate that despite the challenging and antagonistic requirements of meeting both high $CO_2$ pressure-release (i.e. high gas flow out) and low OTR (i.e. low oxygen in), the inventive device including the configured microchannel is capable of meeting both requirements simultaneously, keeping headspace oxygen levels below around 5% over the course of at least 120 days for the optimized low-flow design. In contrast with traditional and ubiquitous valve devices described in the prior art, which as mentioned previously function to limit OTR by completely closing off the package contents, the microchannel is counterintuitively designed to always be open, freely allowing gas to transfer out of the package while tightly restricting the flow through appropriate selection of cross-sectional area and length of the channel. A useful measure of this $CO_2$ vs. OTR performance is provided by the flow of $CO_2$/OTR ratio identified by the inventor and described herein.

Beyond coffee, the inventive device and method enables the customization of channel dimensions to meet almost any $CO_2$, OTR and air flow requirements for each unique good, including for living produce such as vegetables and fruits, among others. For example, many packaged vegetables can only tolerate a certain percentage of $CO_2$ while needing a tightly controlled but minimal level of oxygen in their package environment to sustain cell activity at just the right level to prevent cell death and spoilage.

In an example method for controlling package pressure and gas flow for a packaged good, first an acceptable $CO_2$ level and OTR requirements are identified for the packaged good. Then, the appropriate cross-sectional area and length of a channel is determined that can control the rate of flow of $CO_2$ from the inside of a package to the outside of a package, and control or restrict the oxygen transmission rate from the outside of a package to the inside of a package, such that both the acceptable $CO_2$ level and oxygen transmission rate requirements would be satisfied for that good. Next, a channel is formed in a film structure based on the determined appropriate cross-sectional area and length. In some cases a single channel may not be sufficient to both enable sufficient out-gassing of a package while also minimizing OTR, and in such case the method may include determining an appropriate number of channels having the same or different cross-sectional areas and lengths that would satisfy the acceptable $CO_2$ and OTR requirements for the packaged good. Since the performance of each channel is additive in nature with respect to gas flow and OTR, this determination may be made with relative ease.

The channel or channels may be formed directly in the package film structure itself, using for example the laser ablation techniques described herein, or in a preferred embodiment, is formed in a separate film structure which may be adhered onto and over an orifice in the package wall (such as described with reference to FIGS. 9 and 11A for example). This film structure may be provided as numerous adhesive patches in roll format for easy storage, transport and installation on a packaging line.

Due to the inventive device and method herein, it is anticipated that the shelf-life of produce and other goods will be greatly extended, thereby minimizing food waste and saving tremendous cost for families and businesses. Further, due to the minimal material requirements of the device and method, package weight and shipping cost as well as manufacturing costs may be greatly reduced for the benefit of the environment.

While the invention has been described with reference to exemplary examples and embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) and examples herein disclosed, but that the invention will include all embodiments falling within the scope of the appended claims.

The invention claimed is:

1. A device for controlling package pressure and gas flow for a perishable packaged good comprises:
    a film having a first opening for exposure to the inside of a package and a second opening for exposure to the outside of a package; and
    a laser-ablated microchannel extending between the first opening and the second opening, wherein the dimensions of the microchannel are configured to control the rate of flow of $CO_2$ (cc/min @ 1 PSI) from the inside of the package to the outside of the package and control the oxygen transmission rate (cc/day/Atm) from the outside of the package to the inside of the package so that a flow of $CO_2$/OTR ratio is between about 0.1 and about 100.

2. The device of claim 1, wherein the flow of $CO_2$/OTR ratio is between about 0.2 and about 50.

3. The device of claim 1, wherein the flow of $CO_2$/OTR ratio is between about 0.2 and about 16.

4. The device of claim 1, wherein the dimensions of the microchannel are further configured to control the rate of flow of $CO_2$ from about 0.001 cc/min to about 1000 cc/min at 1 PSI.

5. The device of claim 1, wherein the dimensions of the microchannel are further configured to control the rate of flow of $CO_2$ from about 0.010 cc/min to about 100 cc/min at 1 PSI.

6. The device of claim 1, wherein the dimensions of the microchannel are further configured to control the rate of flow of $CO_2$ from about 0.03 cc/min to about 35 cc/min at 1 PSI.

7. The device of claim 1, wherein the dimensions of the microchannel are configured using the cross-sectional area of the microchannel and the length of the microchannel.

8. The device of claim 7, wherein the cross-sectional area of the microchannel is between about 1,500 $\mu m^2$ to about 1 $mm^2$.

9. The device of claim 7, wherein the cross-section area of the microchannel is between about 1,500 $\mu m^2$ to about 100,000 $\mu m^2$.

10. The device of claim 7, wherein the length of the microchannel is between about 1 mm to about 100 cm.

11. The device of claim 7, wherein the length of the microchannel is between about 3 mm to about 200 mm.

12. The device of claim 1, wherein the film is a multilayer film.

13. The device of claim 1, wherein the packaged good comprises coffee, and wherein the dimensions of the microchannel are further configured to maintain a percentage of headspace oxygen of less than or equal to about 5% over a period of 120 days from the day of packaging the coffee.

14. A method for controlling package pressure and gas flow for a perishable packaged good comprises:
identifying an acceptable $CO_2$ level and oxygen transmission rate requirements for the packaged good;
determining the appropriate cross-sectional area and length of a microchannel that can control the rate of flow of $CO_2$ from the inside of a package to the outside of a package and control the oxygen transmission rate from the outside of a package to the inside of a package such that both the acceptable $CO_2$ level and oxygen transmission rate requirements would be satisfied; and
laser-ablating a microchannel in a film structure based on the determined appropriate cross-sectional area and length.

15. The method of claim 14, further comprising determining an appropriate number of microchannels having an appropriate cross-sectional area and length such that both the acceptable $CO_2$ level and oxygen transmission rate requirements would be satisfied.

16. The method of claim 14, further comprising affixing the film structure onto a package to form a gas-tight communication between the microchannel and the package contents.

17. The method of claim 14, further comprising forming the microchannel in a film structure of a package.

18. The method of claim 16, wherein the package comprises coffee, and further comprising maintaining a percentage of headspace oxygen of less than or equal to about 5% over a period of 120 days from the day of packaging the coffee.

19. The method of claim 16, wherein the package comprises living produce, and further comprising maintaining a percentage of oxygen inside the package to prolong the shelf-life of the living produce.

* * * * *